United States Patent
Nagaraj

(10) Patent No.: US 11,635,983 B2
(45) Date of Patent: Apr. 25, 2023

(54) PRE-TRAINED SOFTWARE CONTAINERS FOR DATACENTER ANALYSIS

(71) Applicant: Hewlett Packard Enterprise Development LP, Houston, TX (US)

(72) Inventor: Venkatesh Nagaraj, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 102 days.

(21) Appl. No.: 17/229,459

(22) Filed: Apr. 13, 2021

(65) Prior Publication Data
US 2022/0027188 A1 Jan. 27, 2022

(51) Int. Cl.
*G06F 15/173* (2006.01)
*G06F 9/455* (2018.01)
*H04L 41/5009* (2022.01)

(52) U.S. Cl.
CPC ...... *G06F 9/45558* (2013.01); *H04L 41/5009* (2013.01); *G06F 2009/45562* (2013.01); *G06F 2009/45595* (2013.01)

(58) Field of Classification Search
CPC ....... G06F 9/45558; G06F 2009/45562; G06F 2009/45595; H04L 41/5009
See application file for complete search history.

(56) References Cited

U.S. PATENT DOCUMENTS

| | | | |
|---|---|---|---|
| 10,614,071 B1 | 4/2020 | Chen et al. | |
| 10,621,513 B2 | 4/2020 | Deshpande et al. | |
| 10,635,563 B2 | 4/2020 | Salunke et al. | |
| 2017/0250892 A1* | 8/2017 | Cooper | G06F 21/552 |
| 2017/0315795 A1* | 11/2017 | Keller | G06F 11/3409 |
| 2018/0300653 A1 | 10/2018 | Srinivasan et al. | |
| 2019/0354388 A1 | 11/2019 | Mitra et al. | |
| 2020/0162330 A1* | 5/2020 | Vadapalli | H04L 67/34 |

OTHER PUBLICATIONS

Angel List, "Composable Analytics", Intelligent DataOps, available online at <https://angel.co/company/composable-analytics>, retrieved on May 12, 2021, 8 pages.

(Continued)

*Primary Examiner* — John B Walsh
(74) *Attorney, Agent, or Firm* — Hewlett Packard Enterprise Patent Department

(57) ABSTRACT

Examples described relate to using pre-trained software containers for datacenter analysis. In an example, an onsite computing device may discover devices that are part of a datacenter. The onsite computing device may create a relationship amongst a group of devices, based on a criterion. The onsite computing device may download a pre-trained software container to each device of the group from a cloud system. A pre-trained software container is specific to each device the pre-trained software container is downloaded to, and is pre-trained to collect telemetry data from the respective device. A pre-trained software container may identify an anomaly related to the respective device from the telemetry data, and generate an inference in a pre-defined format. The onsite computing device may receive the inference from respective pre-trained software container and analyze the inference.

20 Claims, 5 Drawing Sheets

(56) References Cited

OTHER PUBLICATIONS

Barbhuiya et al., "RADS: Real-time Anomaly Detection System for Cloud Data Centres", Nov. 11, 2018, pp. 1-14.
Intelligent Dataops, "Composable Analytics | Intelligent DataOps. Enterprise AI.—Composable", available online at <https://composable.ai/>, 2021, 17 pages.
Lacework, "Anomaly Detection for Cloud & Container Environments", 2019, pp. 1-6.
Naseer et al., "Enhanced Network Anomaly Detection Based on Deep Neural Networks", Journal of Latex Class Files, vol. 14, No. 8, Aug. 2015, pp. 1-16.
Simijanoska et al., "Machine Learning Based Classification of Multitenant Configurations in the Cloud", ICEST, Jun. 2013, 5 pages.
Tien et al., "KubAnomaly: Anomaly Detection for the Docker Orchestration Platform with Neural Network Approaches", available online at <onlinelibrary.wiley.com/doi/full/10.1002/eng2.12080>, Dec. 12, 2019, 37 pages.
Zhang et al., "A Deep Neural Network for Unsupervised Anomaly Detection and Diagnosis in Multivariate Time Series Data", The Thirty-Third AAAI Conference on Artificial Intelligence, 2019, pp. 1409-1416.

\* cited by examiner

PRE-TRAINED SOFTWARE CONTAINERS FOR DATACENTER ANALYSIS

BACKGROUND

A datacenter may centralize and consolidate Information Technology (IT) resources thereby enabling organizations to conduct business round-the-clock. A datacenter infrastructure may include a collection of heterogeneous devices (for example, servers, storage devices, network components, etc.).

BRIEF DESCRIPTION OF THE DRAWINGS

For a better understanding of the solution, examples will now be described, with reference to the accompanying drawings, in which.

DETAILED DESCRIPTION

Figure 1:
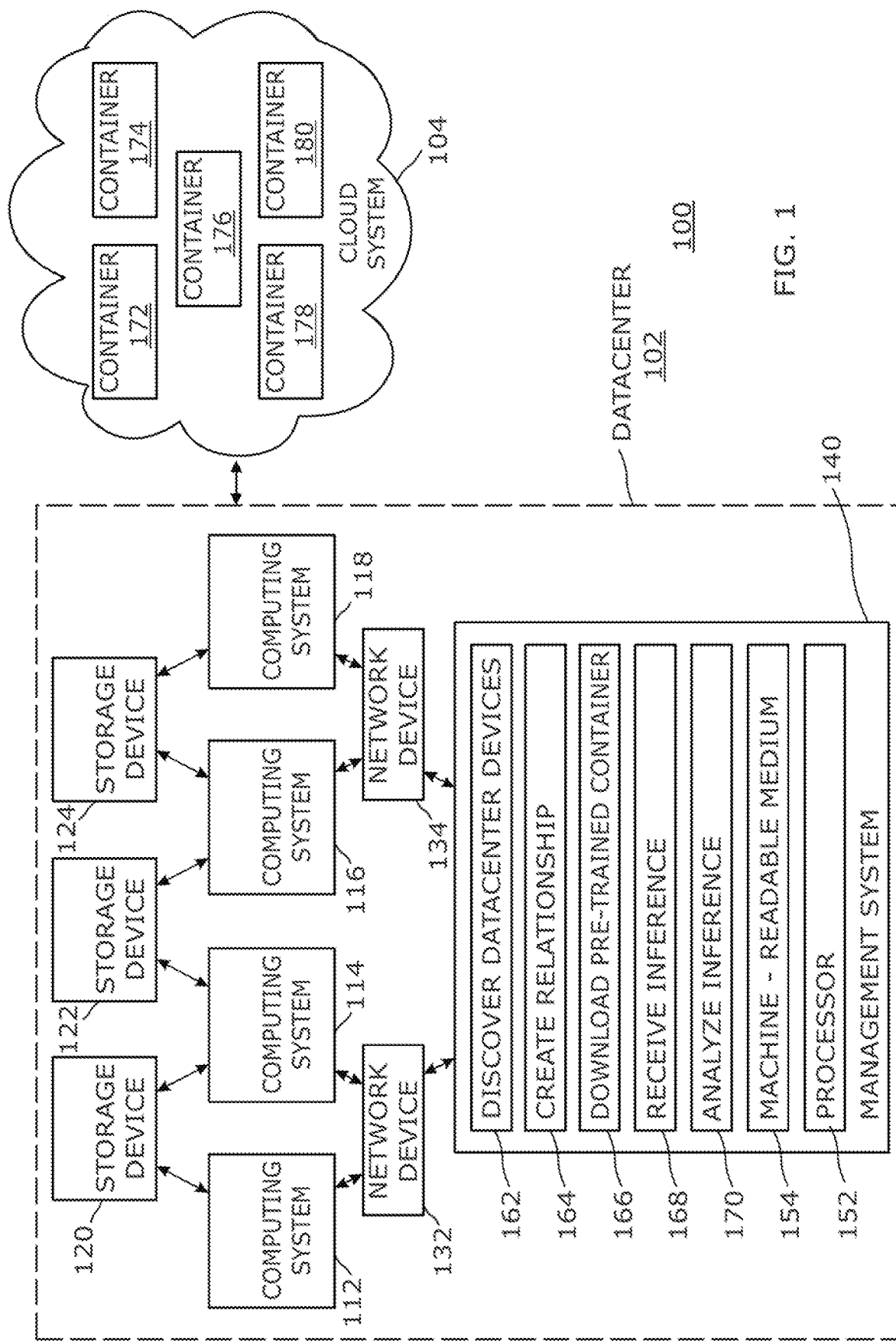
FIG. 1 is a block diagram of an example computing environment for using pre-trained software containers for datacenter analysis.

Datacenters have evolved from single room servers to large server farm facilities that host equipment for information technology. These facilities may include computer servers for data processing, storage, and network devices as core components. From a business context, datacenter planning involves real-estate planning, cost, regulatory requirements, emission, alternative power source etc. Further, datacenter business has evolved from a single-ownership model into a multi-tenant ownership model to cater to cloud business. Each tenant may have different hardware and software requirements, business requirements, and Service Level Agreements (SLAs) related to data processing and storage.

Assessing datacenter efficiency regardless of the size of the datacenter is desirable from a business perspective. Understanding datacenter infrastructure utilization, provisioning, performance, energy utilization, etc. may enable a business to plan for future requirements successfully. To that effect, understanding a datacenter's behavior through analytics may enable an organization to realize a rapid ROI, which, in turn, may help it adapt better to opportunities and challenges. The data generated through analytics may enable a quick ground-level implementation of business decisions. However, generating analytics from datacenter is a challenge as it may involve deriving data from a variety of datacenter devices (e.g., servers, switches, etc.) manufactured by multiple vendors. Further, data generated by these devices may be in multiple formats. In such an environment, implementing a solution for analyzing datacenter performance poses a challenge.

Proposed is a solution involving an onsite computing device, at a datacenter location, that uses pre-trained software containers to analyze the behavior of datacenter devices. Software containers may be pre-trained to collect telemetry data from a datacenter device, identify an anomaly related to the datacenter device from its telemetry data, and generate an inference in a pre-defined format. Software containers may be pre-trained to understand parameters such as network traffic, CPU behavior, etc., and may be stacked and composed according to a business logic or requirement (e.g., an SLA). Once an inference is generated, a pre-trained container may share it with the onsite computing device, which may then analyze the inference to provide an insight(s) into a datacenter's behavior and/or performance.

In an example, an onsite computing device may discover devices that are part of a datacenter. The onsite computing device may then create a relationship amongst a group of devices, based on a criterion (an example criterion could be whether the devices are associated with (or assigned to) a specific tenant of the datacenter). Once the relationship is created, the onsite computing device may download a pre-trained software container to each device of the group from a cloud system. A pre-trained software container is specific to each device the pre-trained software container is downloaded to, and is pre-trained to collect telemetry data from the respective device. A pre-trained software container may identify an anomaly related to the respective device from the telemetry data, and generate an inference in a pre-defined format. In an example, the onsite computing device may receive the inference from respective pre-trained software container and analyze the inference(s) to generate an insight(s) related to datacenter's functioning.

FIG. 1 is a block diagram of an example computing environment 100 for using pre-trained software containers for datacenter analysis. In an example, computing environment 100 may include a datacenter 102 and a cloud system 104. In an example, datacenter 102 may include various devices, for example, computing systems 112, 114, 116, and 118, storage devices, 120, 122, and 124, network devices 132 and 134, and a management system 140. Although four computing systems, three storage devices, and two network devices are shown in FIG. 1, other examples of this disclosure may include more or fewer than four computing systems, more or fewer than three storage devices, and more or fewer than two network devices. In an example, the computing environment 100 may include more than one cloud system.

In an example, devices in datacenter 102 may be associated with (or assigned to) a specific user or tenant of datacenter. For example, computing system 112, storage device 122 and network device 132 may be assigned to "Tenant A" and computing system 118, storage device 124 and network device 134 may be assigned to "Tenant B". A user or tenant may be an individual or an entity (e.g., a company, an organization, a firm etc.). The assigned devices may be used to perform a task for the associated user or tenant of the datacenter 102.

In an example, computing systems 112, 114, 116, and 118, and management system 140 may each represent any type of computing device capable of reading machine-executable instructions. Examples of the computing device may include, without limitation, a server, a desktop computer, a notebook computer, a tablet computer, a thin client, a mobile device, and the like.

Network devices 132 and 134 may each include, for example, a hub, a network switch, a network router, a virtual switch, or a virtual router.

Storage devices 120, 122, and 124 may each include a non-transitory machine-readable storage medium that may store, for example, machine executable instructions, data, and/or metadata. Storage devices 120, 122, and 124 may each be an internal storage device, an external storage device, or a network attached storage device. Other examples of storage devices 120, 122, and 124 may each include a hard disk drive, a storage disc (for example, a CD-ROM, a DVD, etc.), a storage tape, a solid state drive, a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In other examples, storage devices 120, 122, and 124 may each be a Direct Attached Storage (DAS) device, a Network Attached Storage (NAS) device, a Redundant Array of Inexpensive Disks (RAID), a data archival storage system, or a block-based device over a storage area network (SAN).

Computing devices 112, 114, 116, and 118 may be communicatively coupled to storage devices 120, 122, and 124. Some example communication protocols that may be used by computing devices 112, 114, 116, and 118 to communicate with storage devices 120, 122, and 124 may include Fibre Channel (FC), Ethernet, Internet Small Computer System Interface (iSCSI), HyperSCSI. ATA over Ethernet (AoE), and Fibre Channel over Ethernet (FCoE).

As used herein, the term "cloud system" (or "cloud") may refer to an on-demand network access to a shared pool of information technology resources (e.g., networks, servers, storage, and/or applications) that can be quickly provisioned. Cloud system 104 may include a public cloud (or a public cloud system), a private cloud (or a private cloud system), or a hybrid cloud (or a hybrid cloud system). To explain briefly, a cloud may be termed a public cloud if cloud computing services are rendered over a public network such as the internet. On the other hand, a private cloud is a proprietary network that supplies services to a specific set of users. A hybrid cloud combines private and public cloud services.

Computing systems 112, 114, 116, and 118, storage devices. 120, 122, and 124, network devices 132 and 134, and cloud system 104 may be communicatively coupled, for example, via a computer network. The computer network may be a wireless or wired network. The computer network may include, for example, a Local Area Network (LAN), a Wireless Local Area Network (WAN), a Metropolitan Area Network (MAN), a Storage Area Network (SAN), a Campus Area Network (CAN), or the like. Further, the computer network may be a public network (for example, the Internet) or a private network (for example, an intranet).

In an example, cloud system 104 may include one or more pre-trained software containers 172, 174, 176, 178, and 180, as shown in FIG. 1. Although five pre-trained software containers are shown in FIG. 1, other examples of this disclosure may include more or fewer than five pre-trained software containers.

Software containers provide a mechanism to securely run an application in an isolated environment, which may be packed with all its dependencies and libraries. A software container may include an entire runtime environment: an application, its dependencies, libraries, and configuration files that may be bundled into one package.

In an example, pre-trained software containers 172, 174, 176, 178, and 180 on cloud system 104 may be designed for respective devices (e.g., a computing system, a storage device, a network device, etc.) in a datacenter (e.g., 102). For example, cloud system 104 may host a Node.JS Web container application for an E-commerce service, a DB container application for database workload, a NoSQL container application for unstructured data, etc.

In an example, pre-trained software containers 172, 174, 176, 178, and 180 may each be pre-trained to collect telemetry data from respective devices they are designed for. In an example, a pre-trained software container (e.g., 172) may collect telemetry data from an agent (machine-readable instructions) running on the host hardware of a specific device. The pre-trained software container may then parse the telemetry data to construct a dataset understandable by a device-specific analytical model present within the pre-trained software container. In an example, pre-trained software containers 172, 174, 176, 178, and 180 on cloud system 104 may each include a device-specific analytical model to train pre-trained software containers 172, 174, 176, 178, and 180 for the devices they are designed for.

A device-specific analytical model in a pre-trained software container may be used to analyze the behavior of a specific device. For example, an analytical model designed for a Redundant Array of Independent Disks (RAID) controller may be trained to analyze the behavior of that specific RAID controller. In an example, a device-specific analytical model may analyze the telemetry data of a specific device to identify, for example, an anomaly related to the device. For example, for a RAID controller and associated drives to predict a performance bottleneck (e.g., I/O performance) and initiate remedial action, Machine Learning (ML) algorithms may be used on the drive telemetry data to train and initiate consistency checks. The telemetry data from the RAID controller and a physical drive may be analyzed to identify features for building the ML model and the data related thereto may be regularly collected to build a dataset. In the case of a physical drive, features that reflect the 1/O performance, for example, "AvgQueueLength" (representing a queue length of the requests that were issued), "TotalReadRequests", "TotalWriteRequests" etc. may be selected. For building the ML model, example algorithms such as Logistic regression, K Nearest neighbor, Support Vector Machine algorithm etc. may be used to analyze data patterns generated from a data set. In the example of RAID controller, Support Vector Machine algorithm may be used to classify various workloads performance on the drive. When the SVM algorithm detects bottle neck pattern multiple times, a consistency check may be triggered to determine if the issue is due to bad blocks on the drive. Once the training and test data has high accuracy, the analytical model is included in a pre-trained software container.

In an example, a device-specific analytical model for a device may be generated outside a datacenter. In such case, the device behavior may be learned through a supervisory learning method for different scenarios using machine learning algorithms. In another example, a device-specific analytical model may be generated, evaluated and/or refined within a datacenter to improve its accuracy. A device-specific analytical model may be fed with real world data from a datacenter (e.g., 102) to reduce error, improve efficiency, and achieve low divergence. For example, k-means clustering algorithm may be hosted within a datacenter (e.g., 102) to predict effective utilization of system Non-uniform memory access (NUMA) nodes. A device-specific analytical model may be regularly trained using a dataset from various similar devices in a datacenter to learn, for example, the behavior of the device it is designed for. For example, for a RAID controller, in order to predict battery life, a potential failure, etc., a dataset from various similar devices in a datacenter may be used to train a device-specific model for the RAID controller.

Once a device-specific analytical model within a pre-trained software container (e.g., 172) has analyzed the telemetry data of a device (e.g., 112), the pre-trained software container may be designed to generate an inference(s) related to the device. In a like manner, pre-trained software containers 172, 174, 176, 178, and 180 on cloud system 104 may each be designed to generate an inference(s) related to their respective devices. In an example, the inference(s) may pertain to an anomaly related to the device. In an example, the inference may be generated in a pre-defined format.

In an example, management system 140 may include a processor 152 and a machine-readable storage medium 154 communicatively coupled through a system bus. Processor 152 may be any type of Central Processing Unit (CPU), microprocessor, or processing logic that interprets and executes machine-readable instructions stored in machine-readable storage medium 154. Machine-readable storage medium 154 may be a random access memory (RAM) or another type of dynamic storage device that may store information and machine-readable instructions that may be executed by processor 152. For example, machine-readable storage medium 154 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 154 may be a non-transitory machine-readable medium.

In an example, machine-readable storage medium 154 may store machine-readable instructions (i.e. program code) 162, 164, 166, 168, and 170 that, when executed by processor 152, may at least partially implement some or all functions of computing system.

In an example, instructions 162 may be executed by processor 152 of management system 140 to discover devices that are part of a datacenter (for example, 102). Thus, management system 140 may discover computing systems 112, 114, 116, and 118, storage devices 120, 122, and 124, and network devices 132 and 134. Devices in a datacenter (e.g., 102) may be discovered through various methods, for example, Redfish (a standard that uses RESTful interface semantics to access a schema based data model), ping sweep, port scan, and Simple Network Management Protocol (SNMP) query.

Once devices present in a datacenter (e.g., 102) are discovered, instructions 164 may be executed by processor 152 of management system 140 to create a relationship amongst a group of devices from the discovered devices, based on a criterion. In an example, the relationship may be created based on a criterion that the group of devices are assigned to (or associated with) a specific tenant of the datacenter. For example, a relationship may be created amongst devices: computing system 112, storage device 122 and network device 132 that may be assigned to "Tenant A" of datacenter 102. Another relationship may be created amongst devices: computing system 118, storage device 124, and network device 134 that may be assigned to "Tenant B" of datacenter 102.

In an example, the relationship may be created based on a criterion that the group of devices are related to a Service Level Agreement (SLA).

In an example, the relationship may be created based on a criterion that the group of devices are capable of generating telemetry data.

In an example, a graphic representation may be created to depict a relationship(s) amongst a group of devices in a datacenter (e.g., 102), based on the criterion employed.

Once a relationship is created amongst a group of devices in a datacenter (e.g., 102), instructions 166 may be executed by processor 152 of management system 140 to download a pre-trained software container to each device of the group from a cloud system (e.g., 104). In an example, the cloud system may be a public cloud system, a private cloud system, or a hybrid cloud system. A pre-trained software container may be downloaded to, for example, a bare-metal device (e.g., a server) or a virtual machine on a device. A pre-trained software container downloaded to a device in the datacenter (e.g., 102) may run using the local hardware, host operating system, and a container virtualization layer directly on the OS.

In an example, a pre-trained software container is specific to each device the pre-trained software container is downloaded to. For example, a pre-trained software container specific to a server may be downloaded to that particular server from a cloud system (e.g., 104). In another example, a pre-trained software container specific to a RAID may be downloaded to the specific RAID controller. In a yet another example, a pre-trained software container specific to a router may be downloaded to that router. Likewise, each device in the group may receive a pre-trained software container(s) designed for it from a cloud system (e.g., 104).

In an example, one or more parameters related to a device may be used to identify a pre-trained software container designed for the device. For example, a parameter identifying a device such as a device name, a device number etc. that may help with device identification may be used to identify a pre-trained container for the device, amongst other pre-trained containers present in cloud system 104. In another example, a parameter identifying an entity associated with a device (such as a manufacturer, seller, etc.) of a device, for example, a vendor ID of a device may be used to identify a pre-trained container designed for the device.

Figure 2:
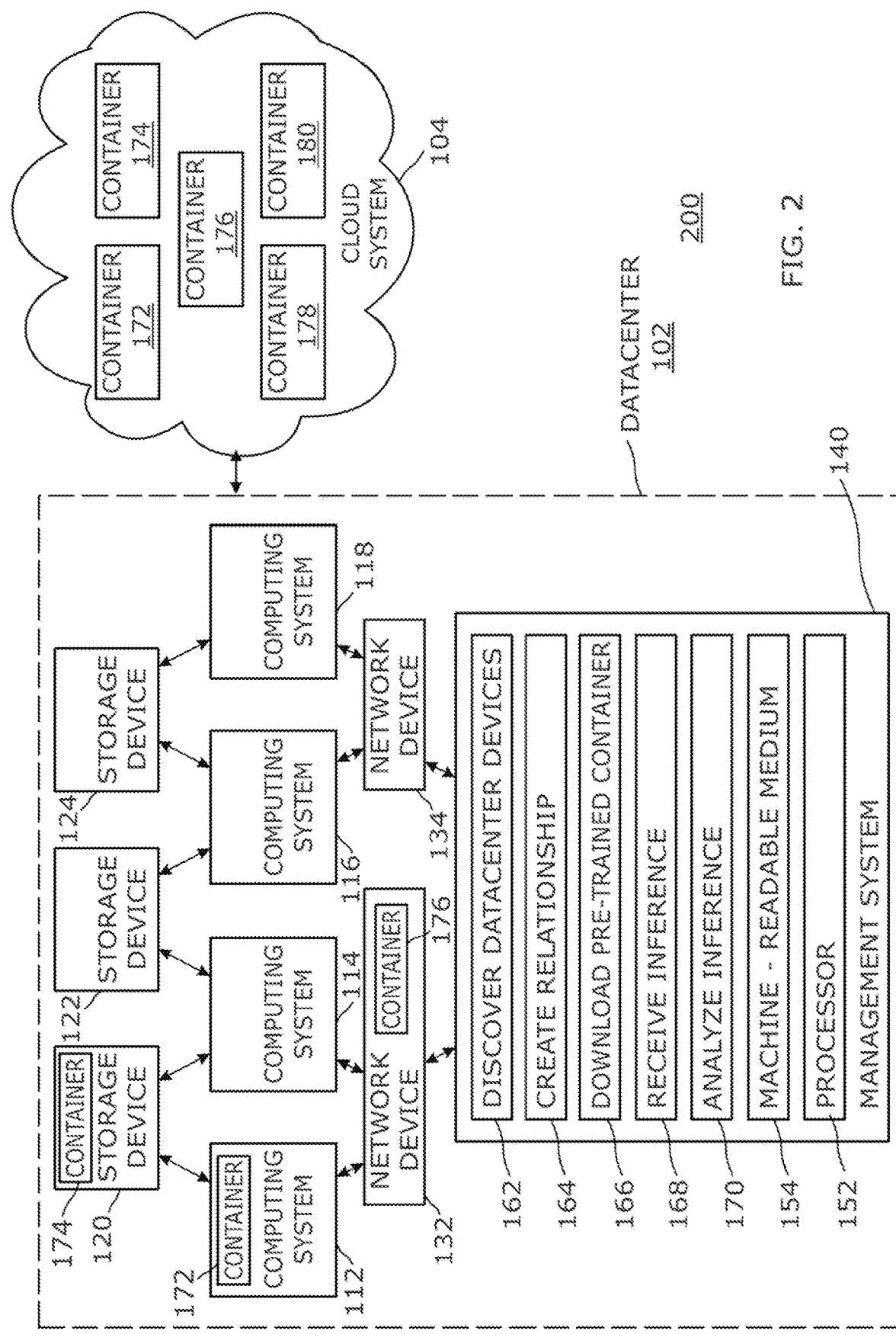
FIG. 2 is a block diagram of an example computing environment for using pre-trained software containers for datacenter analysis.

In a further example, downloading of a pre-trained software container to a device may be based on a relationship status of the device. In an example, the relationship status may include a tenancy status of a device i.e. whether the device is assigned to (or associated with) a specific tenant of the datacenter. For example, if a device is assigned to "Tenant A" of datacenter 102 then a pre-trained software container designed for "Tenant A" may be downloaded to the device. Likewise, if a device is assigned to "Tenant B" of datacenter 102 then a pre-trained software container designed for "Tenant B" may be downloaded to the device. In the event a device is assigned to both "Tenant A" and "Tenant B" of datacenter 102 then separate pre-trained software containers designed for "Tenant A" and "Tenant B" may each be downloaded to the same device. In the example of FIG. 1, a specific pre-trained software container may be downloaded to each device assigned to "Tenant A" of datacenter 102. For example, pre-trained software containers 172, 174, and 176 may be downloaded to computing system 112, storage device 122 and network device 132 respectively. This is illustrated in FIG. 2.

In an example, each pre-trained software container may be pre-trained to collect telemetry data from the respective device. In the example of FIG. 2, pre-trained software containers 172, 174, and 176 may each be pre-trained to collect telemetry data from computing system 112, storage device 122 and network device 132, respectively. In an example, a pre-trained software container may collect telemetry data from an agent (machine-readable instructions) running on the host hardware of a specific device. The pre-trained software container may then parse the telemetry data to construct a dataset recognizable by a device-specific analytical model present within the pre-trained software container. The pre-trained software container may parse the telemetry data into a format that enables identification of an anomaly related to a device.

In the example of FIG. 1, pre-trained software containers 172, 174, and 176 may each parse the telemetry data, collected from their respective device, to construct a dataset understandable by a device-specific analytical model present within respective pre-trained software containers 172, 174 and 176.

A device-specific analytical model may be used to analyze the behavior of a specific device. A device-specific analytical model may analyze the telemetry data of a specific device to identify, for example, an anomaly related to the device. In the example of FIG. 1, a device-specific analytical model present within each of pre-trained software containers 172, 174 and 176 may identify an anomaly related with the respective device.

In an example, a pre-trained software container may be pre-trained to identify other pre-trained software containers on respective devices in a datacenter (e.g., 102). In an example, a pre-trained software container may be pre-trained to interact with other pre-trained software containers on respective devices to identify an anomaly related to a device within a group. In an example, such interaction may occur over a TCP/IP network over secured ports. In an example, a Representational state transfer (REST) API layer may be used to interface and communicate with other containers. The REST API layer may expose services for extracting inferences from a container and importing telemetry data into a container. In the example of FIG. 1, pre-trained software container 172 may interact with pre-trained software containers 174 and 176 to identify an anomaly related to a device associated with "Tenant A". In an example, a pre-trained software container may share information related to an anomaly with other pre-trained software containers. In another example, a pre-trained software container may be pre-trained to interact with other pre-trained software containers on respective devices to address a business requirement (e.g., an SLA). For example, if an SLA expects a device in a group to meet a certain performance expectation, which may be dependent on another device within the group, the pre-trained software containers on respective devices may share information to help identify whether the performance expectation w.r.t. the device is being met or not. In an example, in such case, there may be a scenario wherein one of the pre-trained software containers may be pre-trained to carry information related to a business requirement (e.g., an SLA).

Once a device-specific analytical model within a pre-trained software container has analyzed the telemetry data of a device, the pre-trained software container may be designed to generate an inference(s) related to the device. In the example of FIG. 1, a device-specific analytical model present within the pre-trained software containers 172, 174 and 176 may generate an inference related to the respective device. To provide an example, the telemetry data from a RAID controller and a physical drive may be analyzed by a pre-trained software container to identify features, for example, "AvgQueueLength", "TotalReadRequests", "TotalWriteRequests" etc. that reflect the I/O performance. Support Vector Machine algorithm may be used to classify various workloads performance on the drive. When the SVM algorithm detects bottle neck pattern multiple times, a consistency check may be triggered to determine an inference whether the issue is due to bad blocks on the drive. In an example, the inference(s) may pertain to an anomaly related to a device and may be generated, for example, in a pre-defined format (e.g., in a JavaScript Object Notation (JSON) format).

In an example, instructions 168 may be executed by processor 152 of management system 140 to receive an inference(s) from one or more of the pre-trained software containers on respective devices. In the example of FIG. 1, computing system may receive an inference(s) from one or more of the pre-trained software containers (i.e. 172, 174 and 176) on respective devices (i.e. 112, 120, and 132, respectively). In an example, computing system may receive an inference(s) from one or more of the pre-trained software containers on respective devices across an entire datacenter (e.g., 102).

In an example, instructions 170 may be executed by processor 152 of management system 140 to analyze a received inference(s) and generate an insight related to the behavior and/or performance of a device in a datacenter (e.g., 102). In a like manner, a received inference(s) may be analyzed to generate an insight(s) related to the behavior and/or performance of a set of devices which may be grouped together based on a criterion, for example, a business criterion (e.g., an SLA), a tenancy status of the devices (i.e. considering their association with a specific tenant of a datacenter), etc. In a further like manner, an inference(s) may be analyzed to generate an insight(s) related to the behavior and/or performance of an entire datacenter (e.g., 102).

In the example of FIG. 2, computing system may analyze an inference(s) received from pre-trained software containers (i.e. 172, 174 and 176) to generate an insight(s) related to the behavior and/or performance of a device(s) in datacenter 102 and/or the entire datacenter 102.

Figure 3:
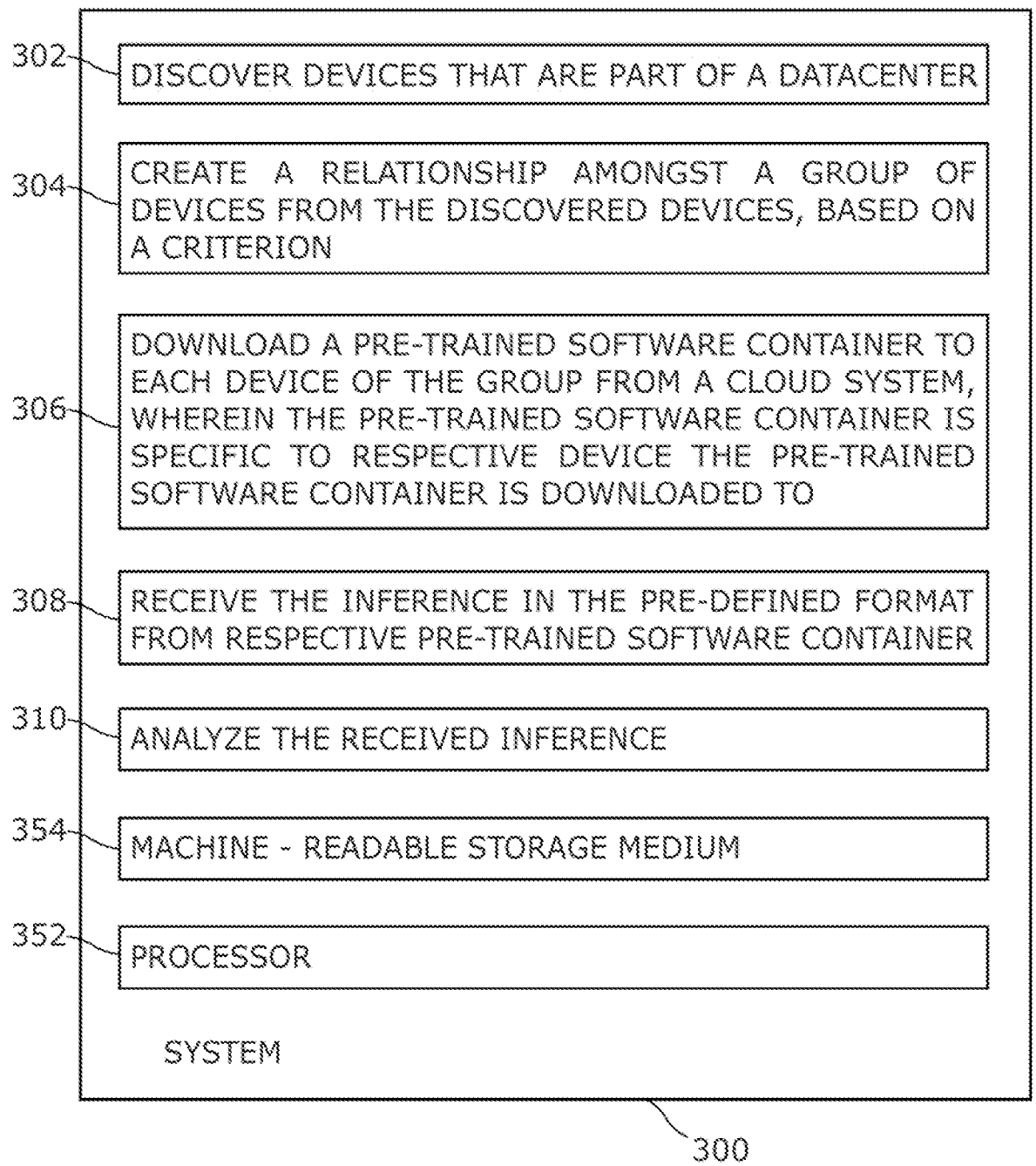
FIG. 3 is a block diagram of an example system for using pre-trained software containers for datacenter analysis.

FIG. 3 is a block diagram of an example system 300 for using pre-trained software containers for datacenter analysis.

In an example, system 300 may be analogous to the system 140 of FIG. 1, in which like reference numerals correspond to the same or similar, though perhaps not identical, components. For the sake of brevity, components or reference numerals of FIG. 3 having a same or similarly described function in FIG. 1 are not being described in connection with FIG. 3. Said components or reference numerals may be considered alike.

In an example, system 300 may include a processor 352 and a machine-readable storage medium 354 communicatively coupled through a system bus. Processor 352 may be any type of Central Processing Unit (CPU), microprocessor, or processing logic that interprets and executes machine-readable instructions stored in machine-readable storage medium 354. Machine-readable storage medium 354 may be a random access memory (RAM) or another type of dynamic storage device that may store information and machine-readable instructions that may be executed by processor 352. For example, machine-readable storage medium 354 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 354 may be a non-transitory machine-readable medium.

In an example, machine-readable storage medium 354 may store machine-readable instructions (i.e. program code) 302, 304, 306, 308, and 310 that, when executed by processor 352, may at least partially implement some or all functions of primary source node.

In an example, instructions 302 may be executed by processor 352 of system 300 to discover devices that are part of a datacenter (e.g., 102). Instructions 304 may be executed by processor 352 of system 300 to create a relationship amongst a group of devices, based on a criterion (an example criterion could be whether the devices are associated with (assigned to) a specific tenant of the datacenter. Once the relationship is created, instructions 306 may be executed by processor 352 of system 300 to download a pre-trained software container to each device of the group from a cloud system. A pre-trained software container is specific to each device the pre-trained software container is downloaded to, and is pre-trained to collect telemetry data from the respective device.

In an example, one or more parameters related to a device may be considered during training of a pre-trained software container for the device. For example, a tenancy status of a device i.e. whether the device is assigned or likely to be assigned to a specific tenant of the datacenter may be taken into consideration. For example, if a device is assigned to (or likely to be associated with) "Tenant A" of datacenter 102 then a pre-trained software container designed for "Tenant A" may be trained accordingly. Likewise, if a device is assigned to (or likely to be associated with) "Tenant B" of datacenter 102 then a pre-trained software container designed for "Tenant B" may be trained per the requirements of Tenant "B".

In an another example, a parameter identifying a device such as a device name, a device number etc. that may help with device identification may be considered during training of a pre-trained software container for the device. In a yet another example, a parameter identifying an entity associated with a device (such as a manufacturer, seller, etc.) such as a vendor ID of a device may be taken as a factor while training a pre-trained container designed for the device.

A pre-trained software container may identify an anomaly related to the respective device from the telemetry data, and generate an inference in a pre-defined format. Instructions 308 may be executed by processor 352 of system 300 to receive an inference from respective pre-trained software container. Instructions 310 may be executed by processor 352 of system 300 to analyze the inference(s) to generate an insight(s) related to datacenter's functioning and/or performance.

Figure 4:
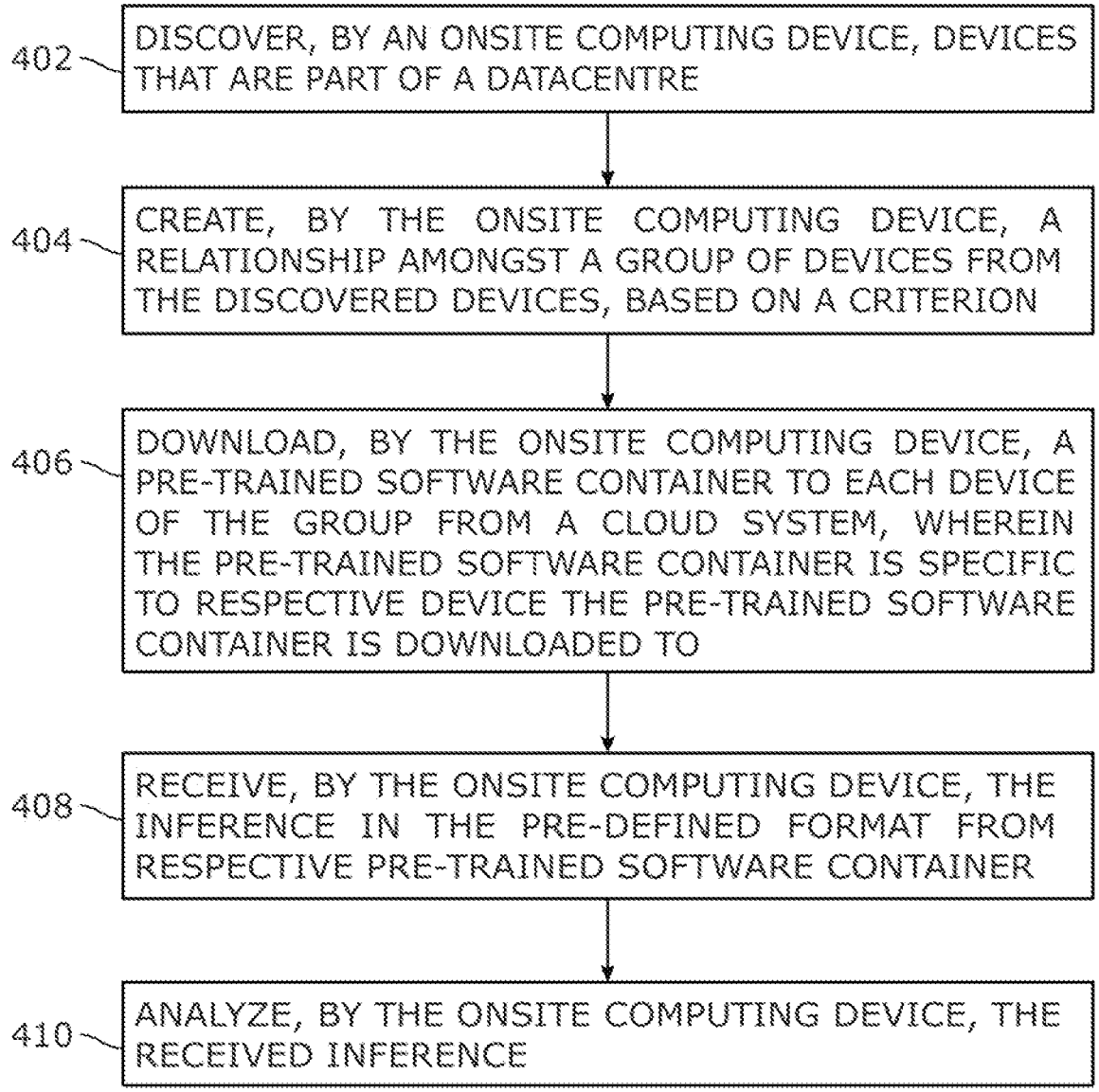
FIG. 4 is a flowchart of an example method of using pre-trained software containers for datacenter analysis.

FIG. 4 is a flowchart of an example method 400 of using pre-trained software containers for datacenter analysis. The method 400, which is described below, may be executed on a system such as system 140 of FIG. 1 or system 300 of FIG. 3. However, other computing platforms or computing devices may be used as well.

At block 402, devices that are part of a datacenter (e.g., 102) may be discovered by a management system (e.g., 140 of FIG. 1). Devices in a datacenter (e.g., 102) may be discovered through various methods, for example, Redfish (a standard that uses RESTful interface semantics to access a schema based data model), ping sweep, port scan, and Simple Network Management Protocol (SNMP) query.

At block 404, the management system may create a relationship amongst a group of devices, based on a criterion. In an example, the criterion includes that the group of devices are associated with a specific tenant of the datacenter Once the relationship is created, at block 406, the management system may download a pre-trained software container to each device of the group from a cloud system. A pre-trained software container is specific to each device the pre-trained software container is downloaded to, and is pre-trained to collect telemetry data from the respective device. A pre-trained software container may identify an anomaly related to the respective device from the telemetry data, and generate an inference in a pre-defined format. In an example, the pre-defined format may include a JSON format.

At block 408, the management system may receive an inference from respective pre-trained software container. In an example, the management system may use REST API to receive the inference.

At block 410, the management system may analyze the inference(s) to generate an insight(s) related to datacenter's performance. In an example, the analysis may include receiving inferences from a plurality of pre-trained software containers.

Figure 5:
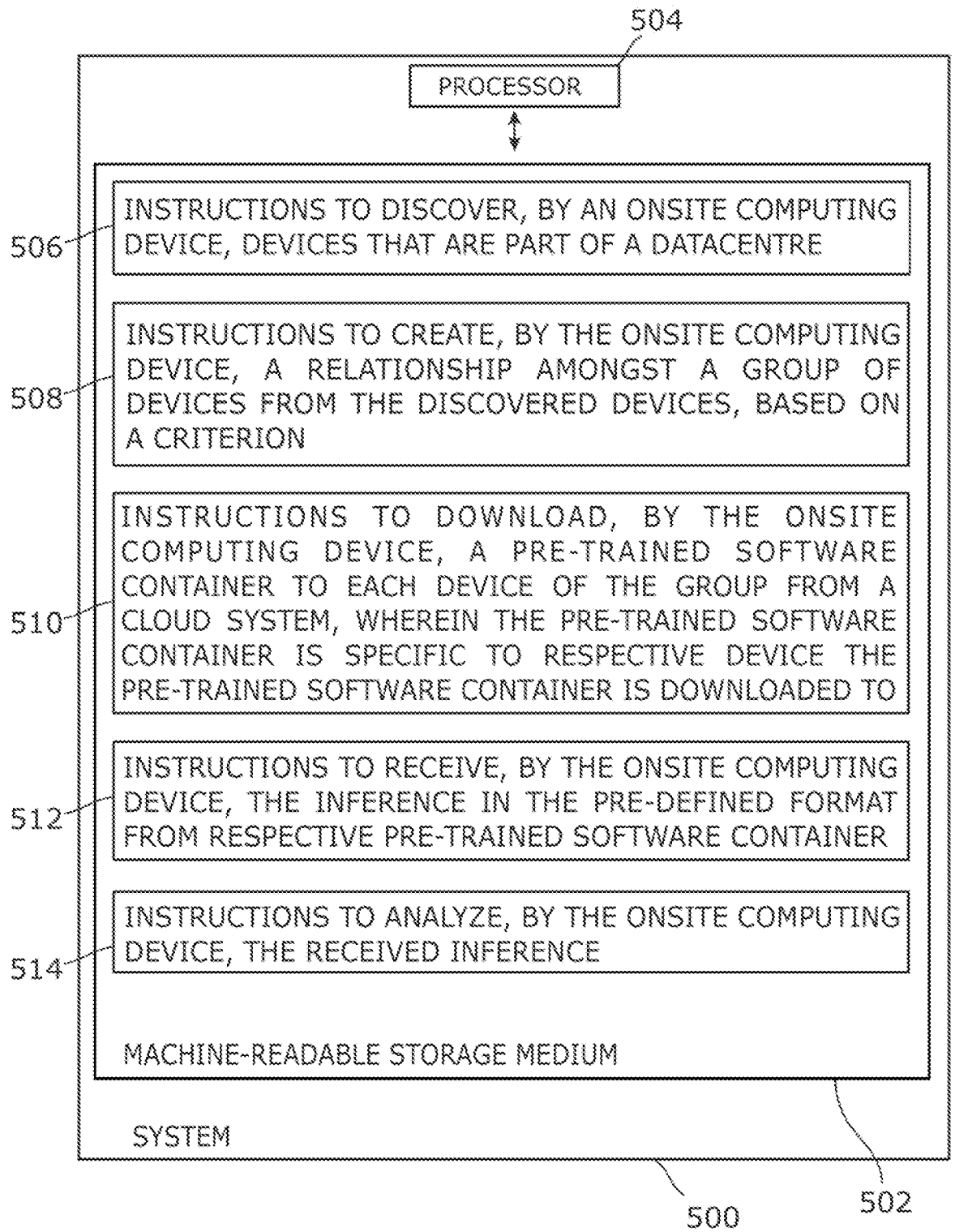
FIG. 5 is a block diagram of an example system including instructions in a machine-readable storage medium for using pre-trained software containers for datacenter analysis.

FIG. 5 is a block diagram of an example system 500 including instructions in a machine-readable storage medium for using pre-trained software containers for datacenter analysis. System 500 includes a processor 502 and a machine-readable storage medium 504 communicatively coupled through a system bus. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 504 may store instructions 506, 508, 510, 512, and 514.

In an example, instructions 506 may be executed by processor 502 to discover devices that are part of a datacenter. Instructions 508 may be executed by processor 502 to create a relationship amongst a group of devices from the discovered devices, based on a criterion. Instructions 510 may be executed by processor 502 to download a pre-trained software container to each device of the group from a cloud system. A pre-trained software container is specific to each device the pre-trained software container is downloaded to, and is pre-trained to collect telemetry data from the respective device. A pre-trained software container may identify an anomaly related to the respective device from the telemetry data, and generate an inference in a pre-defined format. Instructions 512 may be executed by processor 502 to receive the inference in the pre-defined format from respective pre-trained software container. Instructions 514 may be executed by processor 502 to analyze the received inference.

For the purpose of simplicity of explanation, the example method of FIG. 4 is shown as executing serially, however it is to be understood and appreciated that the present and other examples are not limited by the illustrated order. The example systems of FIGS. 1, 2, 3, and 5, and methods of FIG. 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

I claim:

1. A method comprising:
discovering, by an onsite computing device, devices that are part of a datacenter;
creating, by the onsite computing device, a relationship amongst a group of devices from the discovered devices, based on a criterion;
downloading, by the onsite computing device, a pre-trained software container to each device of the group from a cloud system, wherein the pre-trained software container is specific to respective device the pre-trained software container is downloaded to, and
wherein the pre-trained software container is pre-trained to collect telemetry data from the respective device, identify an anomaly related to the respective device from the telemetry data, and generate an inference in a pre-defined format;
receiving, by the onsite computing device, the inference in the pre-defined format from respective pre-trained software container; and
analyzing, by the onsite computing device, the received inference.

2. The method of claim 1, wherein the pre-trained software container collects the telemetry data from an agent running on the respective device.

3. The method of claim 1, wherein the pre-trained software container parses the telemetry data into a format that enables identification of the anomaly related to the respective device.

4. The method of claim 1, wherein the pre-trained software container includes an analytical model to identify the anomaly related to the respective device.

5. The method of claim 1, wherein the criterion includes that the group of devices are associated with a specific tenant of the datacenter.

6. The method of claim 1, wherein the criterion includes that the group of devices are related to a Service Level Agreement (SLA).

7. The method of claim 1, wherein downloading includes downloading the pre-trained software container to a virtual machine (VM) on the respective device.

8. A system comprising:
a processor; and
a machine-readable medium storing instructions that, when executed by the processor, cause the processor to:
discover devices that are part of a datacenter;
create a relationship amongst a group of devices from the discovered devices, wherein the group of devices are associated with a specific tenant of the datacenter;
download a pre-trained software container to each device of the group from a cloud system, wherein the pre-trained software container is specific to respective device the pre-trained software container is downloaded to, and
wherein the pre-trained software container is pre-trained to collect telemetry data from the respective device, identify an anomaly related to the respective device from the telemetry data, and generate an inference in a pre-defined format;
receive the inference in the pre-defined format from respective pre-trained software container; and
analyze the received inference.

9. The system of claim 8, wherein the pre-trained software container is pre-trained to interact with other pre-trained software containers on respective devices to identify an anomaly related to a device within the group.

10. The system of claim 8, wherein the pre-trained software container shares information related to the anomaly with other pre-trained software containers in the datacenter.

11. The system of claim 8, wherein the criterion includes that the group of devices are capable of generating telemetry data.

12. The system of claim 8, wherein the pre-trained software container includes an analytical model to identify the anomaly related to the respective device.

13. The system of claim 12, wherein the analytical model is developed within the datacenter based on data collected from the devices that are part of the datacenter.

14. The system of claim 8, wherein the anomaly is identified through an analytical model trained within the datacenter, based on data collected from the devices that are part of the datacenter.

15. A non-transitory machine-readable storage medium comprising instructions, the instructions executable by a processor to:
discover devices that are part of a datacenter;
create a relationship amongst a group of devices from the discovered devices, based on a criterion;
download a pre-trained software container to each device of the group from a cloud system, wherein the pre-trained software container is specific to respective device the pre-trained software container is downloaded to, and
wherein the pre-trained software container is pre-trained to collect telemetry data from the respective device, identify an anomaly related to the respective device from the telemetry data, and generate an inference in a pre-defined format;
receive the inference in the pre-defined format from respective pre-trained software container; and
analyze the received inference.

16. The storage medium of claim 15, wherein the analytical model is trained within the datacenter based on data collected from the devices that are part of the datacenter.

17. The storage medium of claim 15, wherein the cloud system is one of a public cloud system, a private cloud system, and hybrid cloud system.

18. The storage medium of claim 15, wherein the pre-trained software container is pre-trained to discover other pre-trained software containers in the datacenter.

19. The storage medium of claim 17, wherein the pre-trained software container builds a relationship with at least one of the discovered pre-trained software containers.

20. The storage medium of claim 15, wherein the criterion includes that the group of devices are associated with a specific tenant of the datacenter.

\* \* \* \* \*